US009703837B1

(12) United States Patent
Teng et al.

(10) Patent No.: US 9,703,837 B1
(45) Date of Patent: Jul. 11, 2017

(54) PREDICTING INTEREST OF A USER OF A SOCIAL NETWORKING SERVICE IN A CONTENT ITEM

(71) Applicant: Google Inc., Mountain View, CA (US)

(72) Inventors: Junbin Teng, Cupertino, CA (US); Simon Tong, Palo Alto, CA (US); Boris Mazniker, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 190 days.

(21) Appl. No.: 14/040,424

(22) Filed: Sep. 27, 2013

Related U.S. Application Data (60) Provisional application No. 61/707,877, filed on Sep. 28, 2012.

(51) Int. Cl.
*G06F 17/30* (2006.01)

(52) U.S. Cl.
CPC .............................. *G06F 17/3053* (2013.01)

(58) Field of Classification Search
None
See application file for complete search history.

(56) References Cited

U.S. PATENT DOCUMENTS

| | | | | |
|---|---|---|---|---|
| 7,693,827 | B2* | 4/2010 | Zamir | G06F 17/30867 707/999.003 |
| 2007/0124493 | A1* | 5/2007 | Fogg | H04L 29/06027 709/231 |
| 2009/0063984 | A1* | 3/2009 | Agarwal et al. | 715/733 |
| 2011/0004831 | A1* | 1/2011 | Steinberg et al. | 715/753 |
| 2011/0173198 | A1* | 7/2011 | Malleshaiah et al. | 707/737 |
| 2011/0225170 | A1* | 9/2011 | Obasanjo | G06F 17/30864 707/748 |
| 2012/0110080 | A1* | 5/2012 | Panyam et al. | 709/204 |
| 2013/0317909 | A1* | 11/2013 | Iwabuchi | G06Q 30/0251 705/14.53 |

* cited by examiner

*Primary Examiner* — James Trujillo
*Assistant Examiner* — Aida Tessema
(74) *Attorney, Agent, or Firm* — McDermott Will & Emery LLP (57) ABSTRACT

The subject matter of this specification can be implemented in, among other things, a computer-implemented method including determining an affinity score representing an affinity of a user with respect to a contact of the user, wherein the affinity score is an indication of a strength of a relationship between the user and the contact, determining an engagement score of the user with respect to the contact, wherein the engagement score in an indication of a probability of the user engaging with a content item associated with the contact, determining an interest score of the user with respect to the contact based on the affinity score and the engagement score and providing a plurality of content items posted by the contact display in an activity stream, the content items being ordered based on the interest score. Other aspects can include corresponding systems, apparatus and computer program products.

21 Claims, 4 Drawing Sheets

PREDICTING INTEREST OF A USER OF A SOCIAL NETWORKING SERVICE IN A CONTENT ITEM

CROSS-REFERENCE TO RELATED APPLICATION

The present application claims the benefit of U.S. Provisional patent application Ser. No. 61/707,877, entitled "Predicting Interest of a User of a Social Networking Service In a Content Item," filed on Sep. 28, 2012, which is hereby incorporated by reference in its entirety for all purposes.

BACKGROUND

Users browsing a social networking website may presented with a stream of content items for the users consumption. For example, a user may see a stream of content items containing photos posted by friends or family members, links to stories provided by friends or family members, posted videos viewable to the user, etc. The content items in a stream may be presented in a chronological order, with the latest items displayed before items posted at an earlier point in time. As streams become larger, a purely chronological stream may not be an optimal stream tor use consumption.

SUMMARY

In one aspect, the disclosed subject matter relates to a method for ranking content items in a stream. The method includes determining an affinity score representing an affinity of a user with respect to a contact a the user, wherein the affinity score is an indication of strength of a relationship between the user and the contact. The method may further include determining an engagement score of the user with respect to the contact, wherein the engagement score is an indication of a probability of the user engaging with a content item associated with the contact. The method may further include determining an interest score of the user with respect to the contact based on the affinity score and the engagement score and providing a plurality of content items posted by the contact for display in an activity stream, the content items being ordered based on the interest score. Other aspects can include corresponding systems, apparatus and computer program product.

These and other aspects can provide one or more of the following features. In some implementations, the engagement score is based on a number of opportunities for the user to read a first set of content items posted by the contact and a number of engagements by the user with the first set of content items. In some implementations, the number of opportunities for the user to read the first set of content items posted by the contact and the number of engagements by the user with the first set of content items are both time-decayed numbers. In some implementations, the engagements comprise one or more of an endorsement, a comment, a sharing of a post, a universal resource locator click, expansion of a content item or comment of the content item, or a prolonged read of the content item.

In some implementations, the first set of content items comprises content items posted by the contact displayed in a stream provided to the user. In some implementations, the engagement score is based on a number of opportunities for one or more members of a social group to read a second set of content items posted by the contact and a number of engagements by the one or more members of the social group with the second set of content items, wherein the contact is a member of the social group.

In some implementations, the number of opportunities for one or more members of the social group to read the second set of content items posted by the contact is normalized to a maximum group reads number, and wherein the number of engagements by the one or more members of the social group with the second set of content items is formalized based on the maximum group reads number.

In some implementations, the number of opportunities for one or more members of the social group to read the second set of content items posted by the contact and the number of engagements by the one or more members of the social group with the second set of content items are both time-decayed numbers.

In some implementations, the engagement score is based on a number of opportunities for the user to read a third set of content items posted to the activity stream by a plurality of contacts and a number of engagements by the user with the third set of content items. In some implementations, the affinity score is based on a time-decayed number of communication sessions between the user and the contact. In some implementations, the communication sessions comprise one or more of electronic messages, text, audio, or video chat sessions, or telephone calls. In some implementations, one or more of the engagement score or affinity score is modified based on a relationship between the user and the contact. In some implementations, one or more of either the engagement score or affinity score is modified based on a communication between the user and the contact.

In some implementations, the method may further include determining, an engagement score of the user with respect to each participant of the content item. The method may further include determining a post-level score based on the determined engagement score of the user with respect to each participant and ordering the content item in the activity stream based on the post-level score.

The disclosed subject matter also relates to a computer-readable medium storing instructions that when executed cause a computer to perform operations, the operations including for a plurality of user and contact pairs performing one or more steps including determining an affinity score representing an affinity of the user with respect to the contact, wherein the affinity score is an indication of a strength of a relationship between the user and the contact, determining an engagement score of the user with respect to the contact, wherein the engagement score is an indication a probability of the user engaging with a content item posted by the contact, determining an interest score of the user with respect to the contact based on the affinity score and the engagement score, receiving a request from a first user for content items for an activity stream, retrieving a plurality of content items for display within the activity stream, each contact item being posted by a contact of the user, ordering the retrieved plurality of content items based on the determined interest scores of the user with respect to each of the contacts posting each of the plurality of content items and providing the ordered content items for display in the activity stream of the user. Other aspects can include corresponding systems, apparatus and computer program products.

These and other aspects can provide one or more of the following features. In some implementations, the interest score of the user with respect to the contact based on the affinity score and the engagement score further includes selecting the greater of the affinity score and the engagement score as the interest score, when the affinity score is above an affinity score threshold and selecting the engagement score as the engagement score where the affinity score is below or equal to the affinity score threshold.

In some implementations, the engagement score is based on a number of opportunities for the user to read a first set of content items posted by the contact and a number of engagements by the user with the first set of content items. In some implementations, the engagements comprise one or more of an endorsement, a comment, a sharing of a post, a universal resource locator click, expansion of a content item or comment of the content item, or a prolonged read of the content item. In some implementations, the affinity score is based on a time-decayed number of communication sessions between the user and the contact.

The subject disclosure also relates to a computer-implemented system, the system including one or more processors and a memory comprising instructions which, when executed by the one or more processors, cause the one or more processors to receive a request from a user for content items for an activity stream. The one or more processors may further retrieve a plurality of content items for the activity stream. The one or more processors may further determine, for each content item of the plurality of content items, an affinity score and an engagement score of the user with respect to a contact associated with the respective content item, wherein the affinity score is an indication of a strength of a relationship between the user and the contact associated with the respective content item, and wherein the engagement score is an indication of a probability of the user engaging with a post by the contact and provide one or more of the plurality of content items for display in the activity stream, wherein the content items are ordered based on the retrieved affinity score and engagement score of the user with respect to the contact associated with each of the one or more of the plurality content items.

Other aspects can include corresponding systems, apparatus and computer program products.

The details of one or more implementations are set forth in the accompanying drawings and the description below. Other features and advantages will be apparent from the description and drawings, and from the claims.

DESCRIPTION OF DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those in the art that the subject technology is not limited to the specific details set forth herein and may be practiced without these specific details. In some instances, structures and components are shown in block diagram form in order to avoid obscuring the concepts of the subject technology.

Content items posted to a stream, for example, at a social networking service, may be ranked in order to increase user engagement with such content items (e.g., posts, geographic check-ins, images, or videos). A user is more likely to engage with a content item that is of interest to the user, for example, by commenting on the content item, endorsing the content item, or re-sharing the content item. Thus, more interesting content items may be placed closer to a beginning (e.g., a top) of a stream where the content items are likely to be viewed earlier. The subject technology provides methods and systems for predicting the interest of a user (e.g., a user of a social networking service) in a content item posted to and/or available for display at a social networking service. A user may be interested in a content item posted by a contact if the contact is a close social contact of the user (e.g., a close friend or family member) or if the user regularly engages with content posted by the contact. As used herein, the phrase "engage with content," may refer to explicit engagement (e.g., commenting on the content, endorsing the content, or re-sharing the content, etc.) or implicit engagement (e.g., URL clicks, expanding post/comments, photo clicks 'opening of the light-box', video plays, long reads, clicking on a post as in a mobile device, etc.) with a content it at an application providing a content item for display (e.g., at a social networking service). While the subject technology is described herein in conjunction with content items in a social networking service, the subject technology may also be used in conjunction with content items in other streams (e.g., comment streams in a video sharing service or in a newspaper service), or other activity streams containing videos, views and comments, as well as channel subscriptions.

In various aspects, an affinity score and an engagement score are determined for a user who is viewing content items with respect to a contact who posted the content. In one example, the affinity score may represent the social proximity of the use and the contact who posted the content item. In some examples, the engagement score may represent the likelihood of the user engaging with a content item posted by the contact. In some aspects, each or the affinity and engagement scores is normalized to be in a range between 0 and 1. In some aspects, the affinity score is normalized to represent an affinity score in the range of 0.5 to 1.0 reserved for representing a close tie relationship between the user and the contact (e.g., friends and family, or posts by contacts that user likely does not want to miss). Affinity or engagement scores between a user A and a contact B may be referred to as A/B's engagement score or A/B's affinity score.

An interest score of the user with respect to the contact is determined based on the affinity score and the engagement score. In some aspects, if the affinity score exceeds a threshold value (e.g., 0.5) that indicates closeness between the user and the contact, the interest score is set to the maximum of the affinity score and the engagement score. Otherwise the interest score is set to the engagement score.

In some aspects, an interest score is calculated for each user and contact pair of a social networking system. The interest score for each user/contact pair may be calculated daily, weekly, or by some other time frame.

Posts in a stream for the user may then be ranked at least partially based on the interest score for the contact associated with a content item for the viewing user (e.g., posts by contacts having a higher interest score for the viewing user may be presented on top of posts by contacts having a lower interest score for the viewing user). One advantage of the ranking process described herein is that posts that the user is more likely to be more interested in are provided for display before other posts, thereby increasing user engagement or interest in the stream of content items.

"Posts" as used herein, refer to content items being posted to a stream at one or more applications. In one example, posts may contain various media include text, image, audio, video, an embedded link to other content items, or various other items that may be provided for display. In one example, a "contact" as used herein, refers to a user (e.g., at a social networking service) having a relationship, association or link with another user. In one example, a social graph (e.g., maintained at a social networking site) may maintain associations between one or more users. In some examples, a contact or user is associated with a content item posted to a service, or application, when the contact has authored, generated and/or posted the content item. In one example, the contact may also be associated with a content item if the contact was tagged or otherwise linked with the content item. In some examples, a contact may be associated with content when the contact takes some social action with respect to the content item. Social actions may include endorsing, sharing, reposting, commenting on, or otherwise engaging with a content item.

Figure 1:
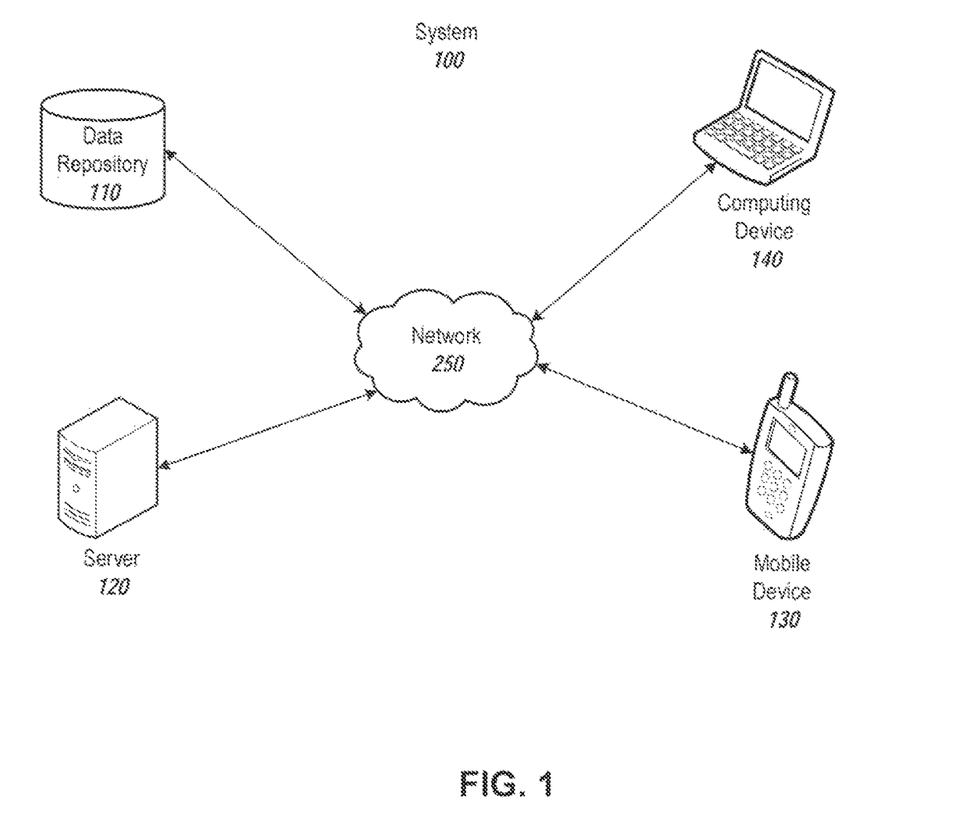
FIG. 1 illustrates an example of a computer system configured to provide content items.

FIG. 1 illustrates an example of a computer system 100 configured to determine an interest score for a user viewing content items with respect to a contact associated with the content item. As shown, the computer system 100 includes a data repository 110, a server 120, a mobile device 130 and a computing device 140. Data repository 110 may include, for example, a relational database, an object-oriented database, a web application server, a file, or any other data storage that can maintain and provide data about news and social content for news aggregator systems. The data repository 110, the server 120, the mobile device 130, and the computer device 140 may be configured to communicate with one another via a network 150. The network 150 may include the Internet, an intranet, a local area network, a wide area network, a wired network, a wireless network, a cellular network, a Wifi network, or a virtual private network (VPN).

The data repository 110 may store data (e.g., content items, contact who provided the content item, explicit engagement data, implicit engagement data, affinity data, etc.) related to a system for determining interest scores. The database may include a single machine, multiple machines, a single processor system, or a multi-processor system. One example of the data repository 110 is described in more detail in conjuction with FIG. 2 below.

The server 120 may include modules for determining interest scores for each user/contact pair in a social networking system. The server 120 may be implemented as a single machine with a single processor, a multi-processor machine, or a server farm including multiple machines with multiple processors. One example of the server 120 is described in more detail in conjunction with FIG. 2 below, The mobile device 130 may be a mobile phone, a personal digital assistant (PDA), a tablet computer, a netbook, or a laptop computer. The mobile device 130 may be portable and may be carried by a user, for example, in a pocket, a purse, a backpack, or a briefcase. The mobile device 130 may also include a mobile browser or a mobile application configured to request content streams (e.g., posts in a social networking system from server 120 and configured to provide user engagement data with the provided content streams to server 120. While only one mobile device 130 is illustrated in FIG. 1, the subject technology may be implemented in conjunction with one or more mobile devices 130.

The computing device 140 may be a laptop computer, a desktop computer , a television with one or more processors embedded therein or coupled thereto, a video game console, a physical machine, or a virtual machine. The computing device 140 may include one or more of a keyboard, a mouse, a display, or a touch screen. The computing device 140 may also include a web browser or an application configured to request content streams (e.g., posts in a social networking system) from server 120 and to provide user engagement data with the provided content streams to server 120.

While each of the data repository 110, the server 120, the mobile device 130, and the computing device 140 are illustrated in FIG. 1 as separate machines, in example aspects, one or more of the databases 110, the server 120, the mobile device 130, and the computing device 140 may be implemented as a single machine. For example, the functions of the data repository 110 and the server 120 may be implemented within a single machine.

Figure 2:
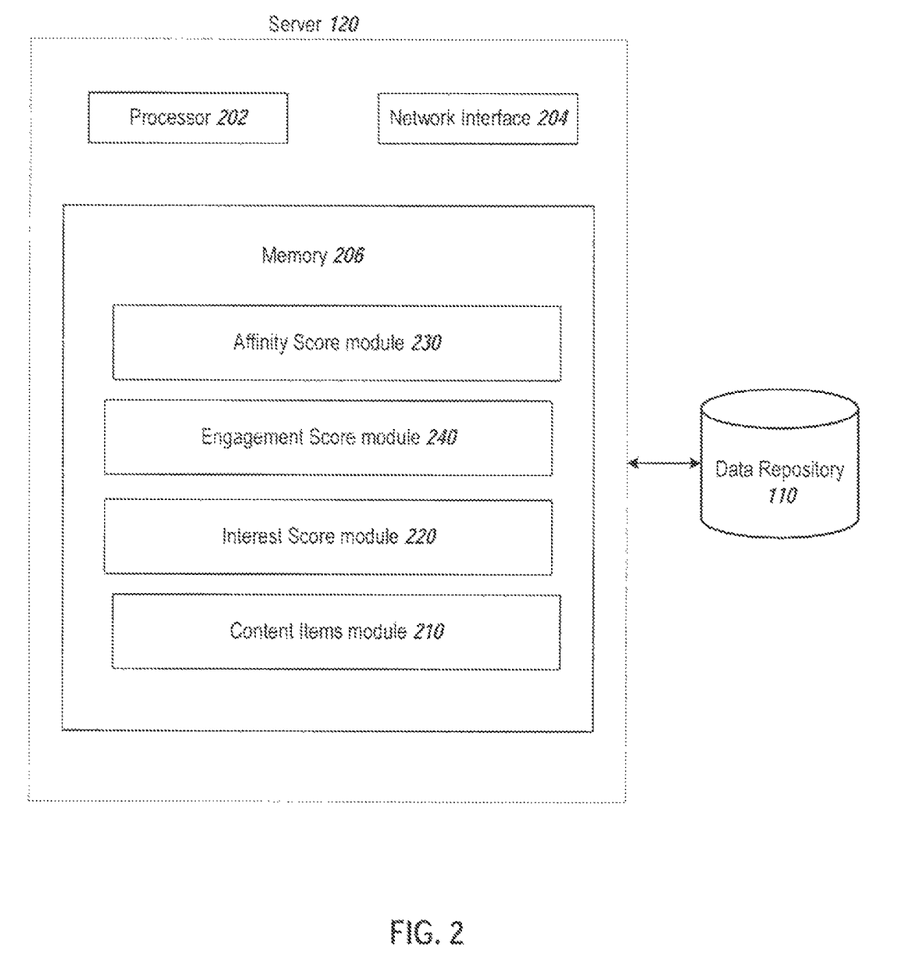
FIG. 2 illustrates an example of the server of FIG. 1 in greater detail.

FIG. 2 illustrates an example of the server and database of FIG. 1 in more detail. As shown, the server 120 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the server 120 may include multiple processors. Furthermore, while the server 120 is illustrated as a single machine, the server 120 may include multiple machines, or portions of computing power available on the cloud. The network interface 204 is configured to allow the server 120 to transmit and receive data in a network, e.g., network 150 of FIG. 1. The network interface 204 may include one or more network interface cards (NICs). The memory 206 may store data or instructions. As illustrated, the memory 206 includes a content items module 210, an interest score module 220, an affinity score module 230, and an engagement score module 240. FIG. 2 also shows a data repository 110 of FIG. 1 that may contain the content items, calculated scores, and other data to support a system for predicting user interest in a post or content item in a stream of content items.

The content items module 210 may be configured to facilitate receiving, from a computing device (e.g., computing device 140 or mobile device 130), a request for one or more content items for display within a content stream. For example, a user upon logging onto a social networking application, or otherwise taking an action at the social networking application, or another application, may invoke a request for the one or more items to be provided for display at the content stream. The content items module 210 is configured to receive the request and may be configured to query data repository 110 for one or more content items for display at a computing device associated with the user. The content items module 210 may be configured to communicate with interest score module 220 to receive information about interest scores for the requesting user and contacts associated with each of the one or more content items retrieved from data repository 110 (e.g., contacts posting the content items to the application).

Interest score module 220 may be configured to provide several user contact interest scores to content items module 210. In one example, the interest score module 220 may be configured to provide an interest score for the user with respect to each unique contact for the retrieved one or more content items. Content items module 210 may be configured to use the received interest scores to rank the content items before providing them for display to the user.

For example, if a user A logs onto a social networking application, a request may be generated for a content stream to be displayed to the user. In one example, 10 content items may be identified as being available for display to the user at the application. In one example, content items are determined to be available for display to the user, if the contact has shared the item for display at the application and the user has the necessary credentials to view the content item (e.g., the content item has been shared with the user or a group to which the user belongs). In this example, the 10 content items are determined to be posted by three unique contacts B, C, and D. The interest score module 220 may provide three pairs of interest scores: A/B's interest score, A/C's interest score and A/D's interest score. Content items provided by contacts B,C, and D may then be ranked based on the user A's interest score with respect to each at these contacts.

The interest score module 220 is may be configured to determine and/or update the interest score for each user/contact pair in the social networking system. In some aspects, an interest score for each user/contact pair in the social networking system on a periodic basis (e.g., daily, weekly, or monthly), or on a per request basis (e.g., when a request for this score is received). In some implementations, an interest score of the user with respect to the contact is determined based on an affinity score and an engagement score. In some aspects, if the affinity score exceeds a threshold value (e.g., 0.5) that indicates a predefined closeness between the user and the contact, the interest score is set to the maximum of the affinity score and the engagement score. Otherwise, the interest score is set to the engagement score.

The affinity score module 230 is configured to calculate an affinity score for each user/contact pair of the social networking service. In some aspects, affinity score module 230 calculates an affinity score for each user/contact pair in the social networking system on a periodic basis (e.g., daily, weekly, or monthly) or on a per request basis. In some embodiments, the affinity score provides an indication of the social proximity of the user to the contact (e.g., whether the contact is a close social contact of the user, and/or a social contact with whom the user communicates frequently). In one or more implementations, the affinity score is determined based on a time-decayed (e.g., with a half-life of one year) number of communication sessions between the user and a contact. The communication sessions can include electronic messages e.g., email), text, audio, or video chat sessions, or telephone calls between the user and the contact, or interactions with content items in a social networking site. For example, a communication session can include the contact sending an electronic message to the user and the user replying. The affinity score may be a number between 0 and 1.

The engagement score module 240 is configured to calculate an engagement score for each pair of user/contact of the social networking service. In some aspects, engagement score module 240 is configured to calculate an engagement score for each pair of user/contact on a periodic basis (e.g., daily, weekly, or monthly) and/or on a per request basis. In some implementations, the engagement score of the user with respect to a contact provides an indication of the level of engagement of the user with content items posted by the contact. The engagement score may be calculated, in some implementations, based on a time-decayed number of times the user engaged with content posted by the contact divided by a time-decayed number of times content posted by the contact was provided for display to the user (e.g., the content items appeared in a stream of the user).

In some aspects, the engagement score is calculated by taking a number of engagements of the user with content posted by the contact divided by the number or reads (or opportunities to read such as the item being provided for display to the user) by the user for content posted by the contact (e.g., engagement score=number of interactions (i)/number of reads (r)). The number of reads may be determined based on how long a post appeared for the user or based on if the user scrolled past the content. The engagement score may be a number between 0 and 1.

For example, a user A may have had opportunities to read 10 posts by a posting contact B (e.g., the posts may have been provided for display to the user in one or more content streams). If the user then engages or interacts (either explicitly or implicitly) with two of those 10 posts, A/B's engagement score equals $2/10$ or 0.2. If the user A clicked on every post associated with contact B, that would lead to a perfect engagement score for A/B of 1 (e.g., $10/10=1$). 1). In some example, the number of engagements may be weighed according to the type of engagements with the content. For example, some types of engagements may have a higher impact on the engagement score. In some example, the number of opportunities or reads may be weighed by the position of the posts within a content feed. For example, items placed in more prominent positions within a content feed may have a higher impact on the engagement score.

In some aspects, the engagement score may be determined based on information about a social group (e.g., a social circle defined by the user, or a system defined group) in which the contact is a member or which includes members having similarities to the user. In some examples, the determination of the engagement score may be based on the information about the social group where there is not enough data regarding the user and the contact (e.g., the user did not receive enough content posted by the contact in his/her stream), in one example, the engagement score may be determined by taking the sum of the interactions, between the user and posts by the contact and the interactions of all members of the social circle with the posts of the contact, and dividing the sum of the interactions by the sum of the opportunities to read, by the user of posts by the contact and the opportunities to read by members of the circle of posts by the contact (e.g., where i represents interactions and r represents reads, then engagement score=i+iCircle/r+rCircle). In some aspects, the engagement score may be based on the interaction of the members of the group with content items posted by a content divided by the number of opportunities and/or reads of the content items by the members of the group. In some aspects, where contact B belongs to or is associated with multiple groups, than the engagement rate from the highest engagement rate, a median engagement rate and/or an average engagement rate among the multiple engagement rates may be selected for calculating the user-to-user engagement score.

For example, if a user A has only one post from a contact B and zero interactions (thereby providing a relatively small data set for a reliable interest score) then contact B's circle may be used in calculating A/B's engagement score. Hypothetically, if contact B belongs to a having multiple members C, D, E, etc., and those. members have had 50 opportunities to read posts by contact B and those members have engaged with those 50 opportunities 10 times, then A/B's engagement score may be determined by taking (0+10)/(1+50), or 0.196.

In some aspects, the number of reads and the number of engagements to be used from a group (e.g., a circle) may be restricted (e.g., to a specific limit) in order to limit the effect of the group's engagement score on the engagement score for a particular user-to-contact pair. In one case, the number of reads to be taken from the group data may be limited to 10. In the above example, the number of reads would need to be normalized to 10 by dividing the actual 50 reads by 5, resulting in the allowed 10 normalized reads from the group data. Once the normalization factor (e.g., 5 in this example) is determined for the allowed 10 reads, then the number of interactions for the group members must also be divided by the determined normalization factor (e.g., 5 in this example) as was required to normalize the group reads to 10. This results in the normalized number or interactions for the group to be 10/5, or 2. The resulting engagement score then can be determined by taking (0+2)/(1+10), or approximately 0.18.

In some aspects, the engagement score may be determined based on information about all or a selected number of social contacts of the user (e.g., engagement score=i+iCircle+iOverall/r+rCircle+rOverall)). In some examples, the engagement score may be determined based on information of all or a selected number of social contacts of the user if there is not enough data regarding the user and the contact (e.g., the user did not receive enough content posted by the contact in his/her stream) and regarding the contact's group or circle's members.

For example, if a user A has only one post from a contact B and zero interactions, and circle data of contact B has two reads and zero interactions, than information from the entire user A's stream may be used to determine an engagement score for determining A/B's engagement score. So, if the user A has 500 posts and 10 interactions with all posts from all contacts then A/B's engagement score may be determined by taking (0+0+10)/(1+2+500), or approximately 0.0198. An engagement score based on the user's overall stream data may be similarly restricted, as the circle data, to have a limited effect on a user-to-user engagement score. In one case, the number of reads to take from a user's overall stream may be limited to a maximum of 10 reads. In this case, the engagement score may be determined by taking (0+0+10/50)/(1+2+500/50), or approximately 0.0154.

In some aspects, the engagement score may be determined regarding content posted by a contact for specific type of content item (e.g., images rather than text posts or geographic check-ins). For example, content items of having the type video may have a separate engagement score, than, for example, content item having the type news item. By determining engagement scores based on content types, provides a finer granularity as to a particular viewing user's interest in a content item or post by any particular contact. For example, a user A may be very interested in photos posted by contact B (thus having a high engagement score for photo type of content items posted by B), while the same user A may have little interest in news items posted by contact B (thus having a low engagement score for news items content posted by contact B).

In some aspects, an engagement or affinity score may be adjusted (e.g., increased or boosted) based on various features. For example, an indication that a contact is a family member or close friend or a user or an indication that the user and the contact engaged in a chat session or a telephone call may result increasing the engagement or affinity score for that user-to-user pair. The score increase may be accomplished by changing the representation of the time-decayed number of times where the user engaged with content posted by contact and the representation of the time-decayed number of times content posted by the contact appeared in a stream of the user. In some examples, the adjustment may be by a threshold value (e.g., increase the former by 7 and the latter by 10.

In some aspects, an engagement score's boost is achieved by adding time-decayed virtual interactions and reads based on some percentile of engagement rate of the user with all of the user's contacts. For example, if 95 percentile of engagement rate for the user with the user's contacts is 0.7, and a contact is in the family circle, then N virtual reads (e.g., 5), result in 0.7*5=3.5 virtual interactions. The five virtual reads and the 3.5 virtual interactions may then be added to the user's other engagement numbers to boost the engagement score. In this example, by taking the engagement rate for the top five percent of contacts of the user, for the family member contact, the family member's post is elevated to an engagement rate of the top five percent the user's contacts. In some aspects, virtual reads and virtual interactions also are time-decayed (e.g., half-life of one year).

The content items module 210 is configured to take into account the affinity score, engagement score, and/or interest score determined for a user-to-contact pair in ranking content items (e.g., posts, etc.). In some aspects, a post-level score is calculated for ranking content items in a stream by taking a combination of user-to-contact engagement or affinity scores for each participant of the post. For example, if a post is authored by B, and has comments posted by C, D, and was shared by E, then the post-level score for a viewing user A may be based on a combination of A/B's engagement or affinity score in some, cases the most important component of the post-level score), A/C's engagement or affinity score, A/D's engagement or affinity score, and A/E's engagement or affinity score. In one aspect, the combination approach limits the total contribution from each role (e.g., author of a post may contribute up to 70% of the score, comment providers may contribute up to 20% of the score, and endorsements up to 10% of the score). The scored for each role may then be combined (e.g., added) to determine the post-level score for ranking content items. In some examples, the calculations (e.g., additions, divisions, or other operations) described throughout calculating one or more scores may be weighted operations, giving some variables more effect or importance in the calculations.

Figure 3:
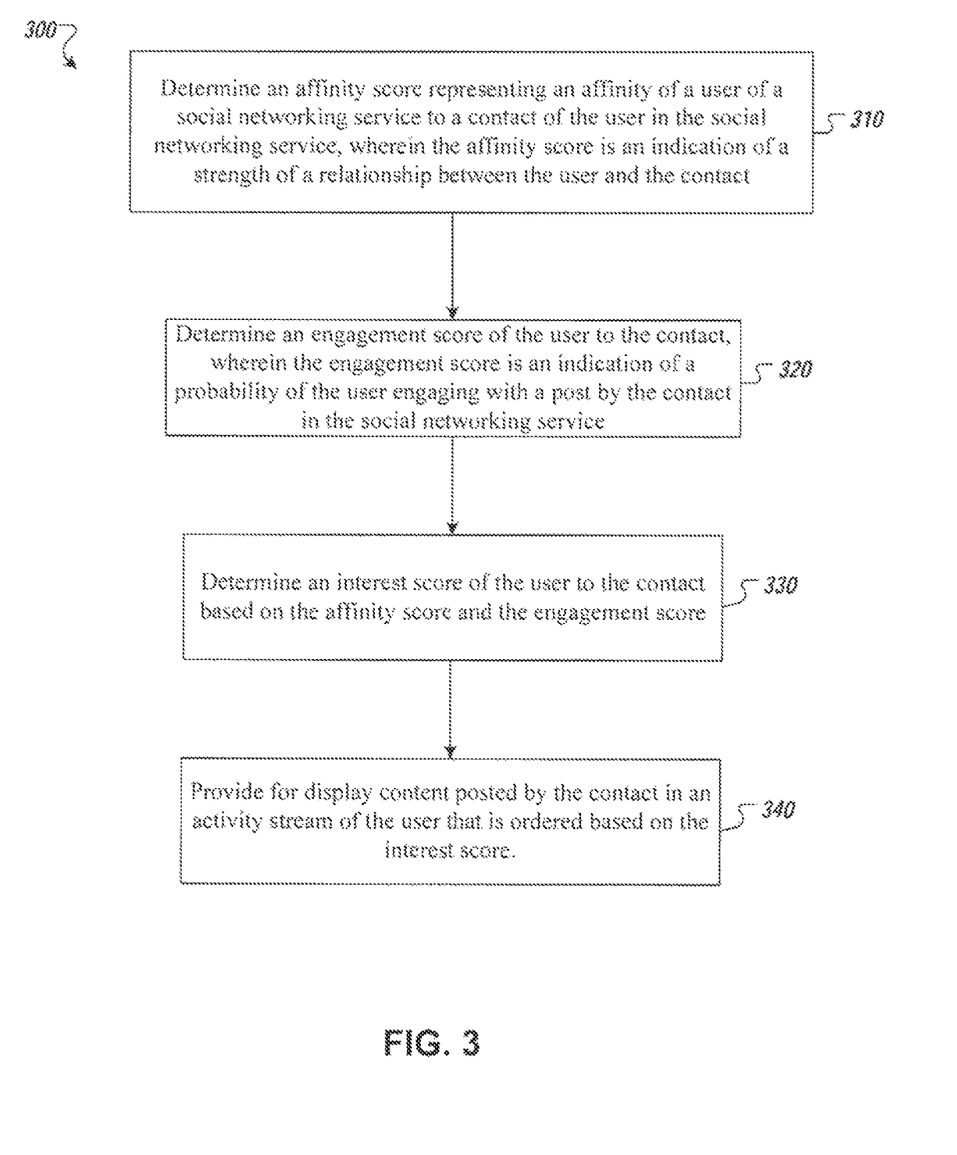
FIG. 3 is a flow diagram of an example process for ordering content items.

FIG. 3 is a flow diagram of an example process 300 for ordering content items for display to a user. The process 300 may be performed, for example, by a system such as the system 100. For clarity of presentation, the description that follows uses the system 100 as examples for describing the process 300. However, another system, or combination systems, may be used to perform the process 300.

Process 300 begins at step 310 where an affinity score representing an affinity of a user of a social networking service with respect to a contact of the user in the social networking service is determined, wherein the affinity score is an indication of a strength of a relationship between the user and the contact. Step 310 may be executed by a batch process. For example, a periodic recalculation for affinity scores may be done on a daily, weekly, or other time interval for user-to-contact pairs. In one example, step 310 may be performed on a per-request basis. An affinity score may be based on a time-decayed number of communication sessions between the user and a contact.

At step 320, an engagement score of the user with respect to the contact is determined, wherein the engagement score is an indication of a probability of the user engaging with a post by the contact (e.g., content item posted or otherwise associated with the contact at the social networking service). Similar, to the affinity score, the engagement score may be calculated by a batch process that runs periodically to calculate an engagement score for user-to-contact pair(s) and/or on a per-request basis. An engagement score may be based on a number of opportunities for the user to read a first set of content items posted by the contact (e.g., the number of times the items of the first set of items were provided for display to the user) and a number of engagements by the user with the first set of content items. The number or opportunities for the user to read the first set of content items posted by the contact and/or the number of engagements by the user with the first set of content items may be time-decayed numbers.

The engagements may be one or more of an endorsement, a comment, a sharing of a post, a universal resource locator click, expansion of a content item or comment of the content item, or at prolonged read of the content item.

The engagement score may be based on a number of opportunities for one or more members of a group (e.g., social circle) to read a second set of content items posted by the contact and a number of engagements by the one or more members of the group with the second set of content items, wherein the contact is a member of the group. The number of opportunities for one or more members of the group to read the second set of content items posted by the contact may be normalized to a maximum group reads number. The number of engagements by the one or more members of the group with the second set of content items may also be normalized based on the maximum group reads number. The number of opportunities for one or more members of the group to read the second set of content items posted by the contact and the number of engagements by the one or more members of the group with the second set of content items are both time-decayed numbers.

The engagement score may be based on a number of opportunities for the user to read a third set of content items posted to the user's activity stream by a plurality of contacts and a number of engagements by the user with the third set of content items.

The engagement score or affinity score may be increased based on a relationship between the user and the contact. The engagement score or affinity score may be increased based on a communication between the user and the contact.

At step 330, an interest score is determined based on the affinity score and the engagement score for the user-to-contact pair. For example, if the affinity score is above a certain threshold then the interest score may be the greater of the affinity score or the engagement score. If the affinity score is equal to or less than the certain threshold then the engagement score is selected as the interest score. The communication sessions may be one or more of electronic messages, text, audio, or video chat sessions, or telephone calls.

Steps 310-330 may be repeated for each user and contact pair in a social networking system. For example, the batch process mentioned above may recursively determine an affinity score, and engagement score, or an interest score for each user and contact pair in the social networking system.

At step 340, one or more content items including one or more content items posted by and/or otherwise associated with the content may be provided for display. In one example, the content items provided for display are ordered based on the interest score determined in step 330. In one example, the interest score is determined for each contact associated with at least one of the one or more content items being provided for display, and the order in which the one or more content items are provided for display is based, at least in part, on the interest score for each contact associated with an item (e.g., an item ranking is based on the interest score of the user with respect to the contact associated with the content item).

In some aspects, a user may request for content items for an activity stream, e.g., upon logging onto a social networking service or sometime during engagement with the service. Content items may be retrieved for the request. An affinity score, engagement score, or interest score may be retrieved for each unique pair of user and contact for the retrieved content items (e.g., the batch process calculated affinity, engagement, and interest scores from steps 310 through 330 for each user and contact pair may be cached or available in a data repository for retrieval). The retrieved content items may be ordered based on the retrieved affinity, engagement, and/or interest scores for each unique pair of user and contact for the retrieved content items. Although the interest score for each content item (based on the user and contact pair for that content item) may be used to order content items in the activity stream, other factors (e.g., similarity of a content item with other content items in the activity stream, etc.) may influence the order of a content item in the activity stream. The ordered content items may be provided for display in the activity stream of the requesting user.

Figure 4:
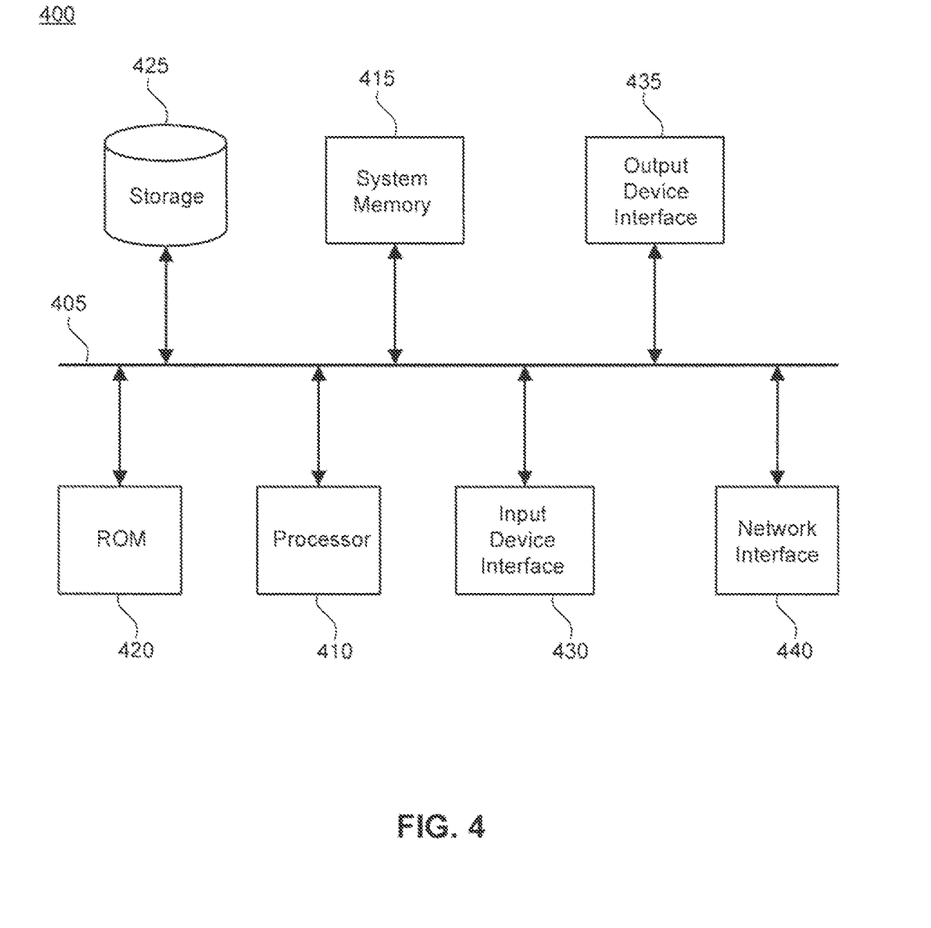
FIG. 4 conceptually illustrates an example electronic system.

FIG. 4 conceptually illustrates an electronic system 400 on which some of the subject technology can be implemented. For example, one or more of the data repository 110, the server 120, the mobile device 130, or the client computing device 140 may be implemented using the arrangement of the electronic system 400. The electronic system 400 can be a computer (e.g., a mobile phone, PDA), or any other sort of electronic device. Such an electronic system include various types of computer-readable media and interfaces the various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order execute the processes of the subject technology. The processing unit(s), can be a single processor or a multi-core processor in different implementations.

The read-only-memory (ROM) 420 stares static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some or the instructions and data that the processor needs at runtime. In some implementations, the processes of the subject technology are stored in the system memory 415, the permanent storage device 425, or the read-only memory 420. For example, the various memory units include instructions for predicting user interest in a content item for a social networking service in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touchscreen that functions as both input and output devices.

Finally, as shown in FIG. 4, bus 405 also couples electronic system 400 to a network (not shown) through a network interlace 440. In this manner, the electronic system 400 can be a part of a network computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wireless over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flaws can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor multi-core processors that execute software, some implementations are performed by one or more integrated circuits, for example application specific integrated circuits (ASICs) of field programmable gate arrays (FPGAs). In some implementations, such integrated circuits execute instructions that are stored on the circuit itself.

As used in this specification and of claims of this application, the terms "computer", "server", "processor", and "memory"all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer, Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components, The components of the system can be interconnected by an form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction can be received from the client device at the server.

It is understood that an specific order or hierarchy of steps in the processes disclosed is an illustration of example approaches. Based upon design preferences, it is understood that the specific order or hierarchy of steps the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically staled otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
    determining an affinity score representing an affinity of a user with respect to a contact of the user, wherein the affinity score is an indication of a strength of a relationship between the user and the contact;
    determining an engagement score of the user with respect to the contact, wherein the engagement score is an indication of a probability of the user engaging with a content item associated with the contact;
    determining affinity scores between the user and each participant of each of a plurality of content items posted by the contact, wherein participants of a content item comprise the contact and one or more of another user that interacts with the content item;
    determining a post-level score for each of the plurality of content items posted by the contact, each post-level score based on the affinity scores between the user and each participant of the respective content item;
    determining an interest score of the user with respect to the contact based on the affinity score and the engagement score; and
    providing the plurality of content items posted by the contact for display in an activity stream, the content items being ordered based on the interest score or the respective post-level scores.

2. The method of claim 1, wherein the engagement score is based on a number of opportunities for the user to read a first set of content items posted by the contact and a number of engagements by the user with the first set of content items.

3. The method of claim 2, wherein the number of opportunities for the user to read the first set of content items posted by the contact and the number of engagements by the user with the first set of content items are both time-decayed numbers.

4. The method of claim 2, wherein the engagements comprise one or more of an endorsement, a comment, a sharing of a post, a universal resource locator click, expansion of a content item or comment of the content item, or a prolonged read of the content item.

5. The method of claim 2, wherein the first set of content items comprises content items posted by the contact displayed in a stream provided to the user.

6. The method of claim 1, wherein the engagement score is based on a number of opportunities for one or more members of a social group to read a second set of content items posted by the contact and a number of engagements by the one or more members of the social group with the second set of content items, wherein the contact is a member of the social group.

7. The method of claim 6, wherein the number of opportunities for one or more members of the social group to read the second set of content items posted by the contact is normalized to a maximum group reads number, and wherein the number of engagements by the one or more members of the social group with the second set of content items is normalized based on the maximum group reads number.

8. The method of claim 6, wherein the number of opportunities for one or more members of the social group to read the second set of content items posted by the contact and the number of engagements by the one or more members of the social group with the second set of content items are both time-decayed numbers.

9. The method of claim 1, wherein the engagement score is based on a number of opportunities for the user to read a third set of content items posted to the activity stream by a plurality of contacts and a number of engagements by the user with the third set of content items.

10. The method of claim 1, wherein the affinity score is based on a time-decayed number of communication sessions between the user and the contact.

11. The method of claim 10, wherein the communication sessions comprise one or more of electronic messages, text, audio, or video chat sessions, or telephone calls.

12. The method of claim 1, wherein one or more of the engagement score or the affinity score is modified based on a relationship between the user and the contact.

13. The method of claim 1, wherein one or more of either the engagement score or the affinity score is modified based on a communication between the user and the contact.

14. The method of claim 1, further comprising:
determining an engagement score of the user with respect to each participant of the content item;
determining a post-level score of the content item based on the determined engagement score of the user with respect to each participant; and
ordering the content item in the activity stream based on the post-level score.

15. A computer-readable medium storing instructions that when executed cause a computer to perform operations, the operations comprising:
for each pair of a plurality of user and contact pairs:
determining an affinity score representing an affinity of the user with respect to the contact, wherein the affinity score is an indication of a strength of a relationship between the user and the contact;
determining an engagement score of the user with respect to the contact, wherein the engagement score is an indication of a probability of the user engaging with a content item posted by the contact; and
determining an interest score of the user with respect to the contact based on the affinity score and the engagement score;
receiving a request from a first user for content items for an activity stream;
retrieving a plurality of content items for display within the activity stream, each content item being posted by the contact of the first user;
determining a post-level score for each of the plurality of content items, each post-level score based on affinity scores or engagement scores between the first user and each participant of the respective content item, wherein participants of a content item comprise the contact and one or more of another user that interacts with the content item;
ordering the retrieved plurality of content items based on the determined interest scores of the user with respect to each of the contacts posting each of the plurality of content items or the respective post-level score for each of the plurality of content items; and
providing the ordered content items for display in the activity stream of the first user.

16. The computer-readable medium of claim 15, wherein determining the interest score of the user with respect to the contact based on the affinity score and the engagement score further comprises:
selecting the greater of the affinity score and the engagement score as the interest score, when the affinity score is above an affinity score threshold; and
selecting the engagement score as the engagement score where the affinity score is below or equal to the affinity score threshold.

17. The computer-readable medium of claim 15, wherein the engagement score is based on a number of opportunities for the user to read a first set of content items posted by the contact and a number of engagements by the user with the first set of content items.

18. The computer-readable medium of claim 17, wherein the engagements comprise one or more of an endorsement, a comment, a sharing of a post, a universal resource locator click, expansion of a content item or comment of the content item, or a prolonged read of the content item.

19. The computer-readable medium of claim 15, wherein the affinity score is based on a time-decayed number of communication sessions between the user and the contact.

20. A computer-implemented system, the system comprising:
one or more processors;
a memory comprising instructions which, when executed by the one or more processors, cause the one or more processors to:
receive a request from a user for content items for an activity stream;
retrieve a plurality of content items for the activity stream;
determine, for each content item of the plurality of content items, an affinity score and an engagement score of the user with respect to a contact associated with the respective content item, wherein the affinity score is an indication of a strength of a relationship between the user and the contact associated with the respective content item, and wherein the engagement score is an indication of a probability of the user engaging with a post by the contact, the engagement score based on interactions between the user and posts of the contact and interactions between members of a social group of the contact and the content items posts of the contact;
determine affinity score between the user and each participant of the plurality of content items posted by the contact, wherein the participants of the content item comprise the contact and one or more of another user that interacts with the content item;
determine, for each content item of the plurality of content items, a post-level score based on the affinity scores between the user and each participant of the respective content item; and
provide one or more of the plurality of content items for display in the activity stream, wherein the content items are ordered based on the determined affinity score and engagement score of the user with respect to the contact associated with each of the one or more of the plurality content items or the respective post-level scores for the plurality of content items.

21. The computer-implemented method of claim 1, wherein determining the post-level score for each of the plurality of content items posted by the contact further comprises combining the affinity score between the user and the contact, and the affinity scores between the user and each of the one or more of another user that interacted with the respective content item.

* * * * *